June 7, 1949.  A. KYLE ET AL  2,472,255
TOOLHOLDER
Filed Oct. 8, 1945

INVENTOR
ANTHONY KYLE & JOHN A. JOHNSON
BY HARRIS, KIECH, FOSTER & HARRIS

FOR THE FIRM
ATTORNEYS

Patented June 7, 1949

2,472,255

UNITED STATES PATENT OFFICE 2,472,255

TOOLHOLDER

Anthony Kyle and John A. Johnson,
Los Angeles, Calif.

Application October 8, 1945, Serial No. 620,974

5 Claims. (Cl. 82—36)

Our invention relates in general to tool holders which are adapted for being mounted on a machine to hold a tool for processing an article carried by the machine and, more specifically, to a readily detachable tool holder which may be mounted on and removed from the machine repeatedly without varying the desired adjustment of the tool held thereby relative to the article when the tool holder is again mounted on the machine. The present invention includes improvements on the tool holders disclosed in our co-pending application, Serial No. 479,208 which was filed on March 15, 1943, and which is now Patent No. 2,389,853.

Although the fundamental concepts of our invention are applicable to tool holders for use in connection with a wide variety of machining installations, these concepts are particularly applicable to tool holders for use on such machines as lathes and will primarily be considered in connection therewith for convenience in effecting a disclosure of the invention. Our disclosure will enable those proficient in the art to apply the fundamental concepts of our invention to tool holders for use on various other machining installations.

A single machine, such as an engine lathe, may frequently be employed for performing several successive machining operations on each of a number of articles, it perhaps being necessary to change tools several times while processing each individual article. It will be apparent that if each of the tools employed for the various operations must be removed from the tool holder after every operation, a considerable amount of time will be expended for changing the tools and securing the proper adjustment thereof relative to the article being machined. The time required to machine the articles by a procedure of this nature may increase the cost of production thereof to such an extent that the articles cannot be manufactured in competition with similar articles produced by other methods. Moreover, securing the proper adjustment for the various tools frequently requires considerable skill and the machine employed for such a procedure may require the full attention of a highly skilled operator, thereby further increasing the production costs of the articles.

In view of the foregoing considerations, a primary object of our invention is the provision of a simple and efficient tool holder which may be mounted on and removed from a machine readily and repeatedly without altering an initial adjustment of a tool held thereby.

In accordance with the foregoing primary object of our invention, we contemplate the provision of a tool holder including a base member which is adapted for being rigidly mounted on the machine, and including a tool holding member which is adapted for having a tool rigidly secured thereto with a predetermined initial adjustment, the tool holding member being connected to the base member in such a manner that the tool holding member may be accurately connected to and may be detached from the base member readily and repeatedly without altering the initial adjustment of the tool. The tool may be secured to the tool holding member with the desired initial adjustment and the tool holding member may thereafter be employed for an indefinite number of intermittent operations without affecting the initial adjustment of the tool. Thus, by employing a plurality of interchangeable tool holding members each adapted for having a tool secured thereto in proper adjustment, the initial adjustments of the various tools may be made by a skilled operator and the subsequent operation of the machine may be delegated to an operator of relatively lesser skill, which is another object of our invention.

Still another object of our invention is the provision of a reliable and simple means for connecting the tool holding member to the base member in a positive manner to insure repeated and exact duplication of an initial position of the tool holding member relative to the base member while permitting facile connection and detachment of the tool holding member.

An additional object is to provide adjusting means carried by one of the members and adapted for engagement with the other member to permit adjustment of the tool holding member and the tool held thereby relative to the base member.

An important object of our invention is the provision of readily releasable means for securing the tool holding member to the base member to provide a rigid tool holder, the securing means being actuable by a force exerted on a tool held by the tool holding member by an article to which the tool is applied. A related object is the provision of wedge means for actuating the securing means to secure the tool holding member to the base member, the wedge means being adapted for insertion between the tool holding member and the base member. Another related object is the provision of means for releasing the tool holding member readily when desired. Still another object in this connection is the provision of retaining means for preventing inadvertent release of the tool holding member.

We prefer to accomplish the foregoing objects by pivotally connecting the tool holding member to the base member in such a manner that the tool holding member is rotatable relative to the base member about a pivot axis and is displaceable relative thereto along the pivot axis, the pivotal connection preferably being provided by a pair of pivot elements which are carried by the members. The pivot elements are rotatable relative to each other about the pivot axis and are displaceable relative to each other along the pivot axis, the pivot elements being adapted for releasable engagement with each other in response to relative displacement thereof along the pivot axis to secure the tool holding member to the base member. One of the members is provided with a surface which is inclined relative to the pivot axis so that a plane normal to the inclined surface is substantially parallel to the pivot axis, a contact element carried by the other member being adapted for engagement with the inclined surface to determine the position of the tool holding member relative to the base member about the pivot axis and being adapted for slidable engagement with the inclined surface to determine the relative positions of the members along the pivot axis. In the preferred embodiment of our invention, the contact element which is adapted for engagement with the inclined surface is preferably included by the adjusting means to permit adjustments of the position of the tool holding member relative to the base member. When the contact element or the adjusting means is urged into engagement with the inclined surface by a force applied to the tool held by the tool holding member, or by a force applied by the wedge means, the contact element or the adjusting means slidably engages the inclined surface and effects relative displacement of the tool holding member and the base member along the pivot axis, whereby the pivot elements are displaced relative to each other along the pivot axis in one direction and into engagement with each other to secure the tool holding member to the base member in a positive manner. The tool holding member may be detached from the base member readily by displacing the pivot elements along the pivot axis in an opposite direction to effect separation thereof, this function being performed by the releasing means as will be described in detail hereinafter. Still another object is the provision of a tool holder of the foregoing general character which is adapted for reducing the overhang of the tool, the overhang being the distance between the surface of the article being machined, or end of the tool, and the nearest point of support for the tool and tool holding member. The overhang may be divided into two components, longitudinal and lateral overhang, the longitudinal overhang being measured in a direction which is parallel to the pivot axis and the lateral overhang in a direction perpendicular thereto. We prefer to reduce the lateral overhang by locating the inclined surface and the contact element or adjusting means between the pivot axis and the article being machined, and prefer to reduce the longitudinal overhang by locating the inclined surface and the contact element or adjusting means in close proximity to a plane normal to the pivot axis and traversing the end of the tool.

The foregoing and various other objects and advantages of our invention may be realized by the exemplary embodiment shown in the accompanying drawing, which is intended as illustrative only, wherein.

Figure 2:
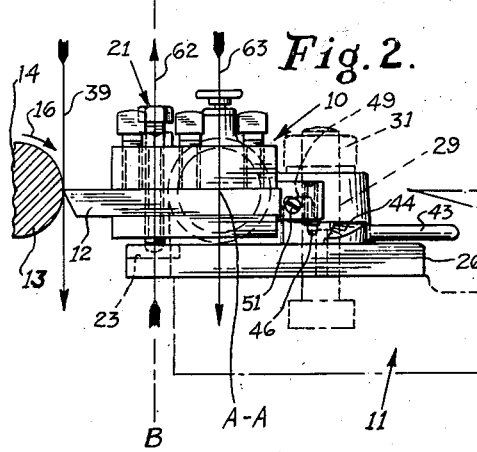
Fig. 2 is an elevational view thereof which is taken as indicated by the arrow 2 of Fig. 1.

Referring particularly to Fig. 2, we show a tool holder 10 which is adapted for being mounted on a supporting member 11 (shown in phantom) and is adapted for holding a tool 12 for processing an article 13. In the particular application of our invention shown in Fig. 2, the supporting member 11 may be the compound slide of a lathe (not shown), the article 13 being carried by the lathe and being rotated about a work axis 14 in the direction indicated by the arrow 16 to permit the removal of excess material therefrom by the tool 12 as will be readily understood by those skilled in the art.

The tool holder 10 includes a base member 17 which is adapted for being rigidly mounted on the supporting member 11, and includes a detachable tool holding member 18 which is adapted for holding the tool 12. The tool holding member 18 is connected to the base member 17 by pivot means 19, the pivot means being adapted to permit rotation of the tool holding member relative to the base member about a pivot axis A—A in order to permit adjustments of the position of the tool 12 relative to the base member and the article 13. The pivot means 19 is also adapted to permit displacement of the tool holding member 18 relative to the base member 17 along the pivot axis A—A (i. e., in a direction parallel to the pivot axis) into locked engagement with the base member as will be described in detail hereinafter.

The tool holder 10 includes a screw 21, comprising an adjusting means for varying the position of the tool holding member 18 relative to the base member 17 about the pivot axis A—A to secure the desired adjustment of the tool 12 with respect to the article 13, the screw being carried by the tool holding member and being adapted for engagement with the base member in the particular embodiment shown. The screw 21 has a lower end 22 adapted for engagement with an inclined surface 23 formed on the base member 17. The surface 23 is inclined with respect to the pivot axis A—A so that the lower end 22 of the screw 21 acts as a contact element and slides along the inclined surface 23 in a direction parallel to the pivot axis to displace the tool holding member 18 into locked engagement with the base member 17 whenever the contact element is urged into engagement with the inclined surface.

Figure 1:
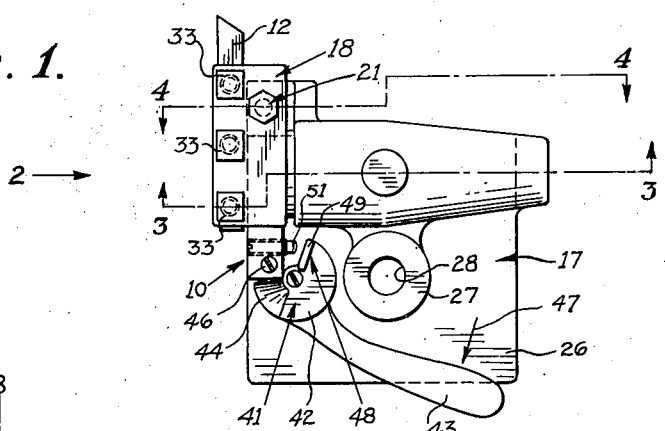
Fig. 1 is a plan view of a tool holder which embodies the fundamental concepts of our invention.

Referring to the construction of the tool holder 10 in detail, the base member 17 includes a flange 26 having a boss 27 thereon with a bore 28 therethrough as best shown in Fig. 1. The supporting member 11 includes a stud 29 which may be inserted in the bore 28, the base member 17 being rigidly secured to the supporting member by a nut 31 as best shown in Fig. 2. The tool 12 is disposed in a groove 32 in the tool holding member 18, as best shown in Figs. 2, 3, and 4, and is rigidly retained therein by a plurality of set screws 33.

Figure 3:
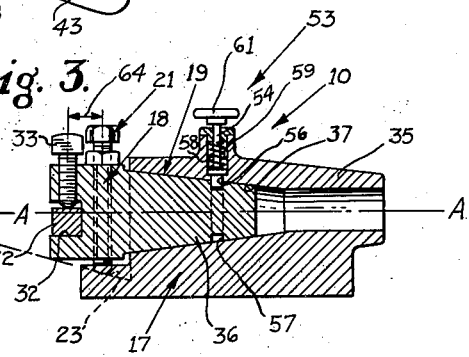
Fig. 3 is a sectional view thereof which is taken as indicated by the broken line 3—3 of Fig. 1.
Figure 4:
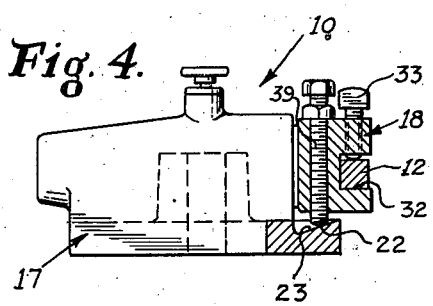
Fig. 4 is a partial sectional view thereof which is taken along the broken line 4—4 of Fig. 1.

As best shown in Fig. 3, the pivot means 19 includes pivot elements 35 and 36 which are carried by and preferably formed integrally with the base member 17 and tool holding member 18, respectively. The pivot element 35 is preferably provided with a substantially conical pivot socket 37 therein which is adapted to receive the pivot element 36, the pivot element 36 being a substantially conical spindle. The pivot spindle 36 is rotatable relative to the pivot socket 37 about the pivot axis A—A to permit rotation of the tool holding member 18 relative to the base member 17 to permit adjustment of the position of the tool 12. The pivot spindle 36 is also displaceable along the pivot axis A—A and may be displaced into locked engagement with the pivot socket 37 to secure the tool holding member 18 to the base member 17 in a rigid manner whenever the contact element 22 is urged into slidable engagement with the inclined surface 23 as will be described in detail hereinafter.

The position of the tool holding member 18 relative to the base member 17 about the pivot axis A—A is determined by the position of the screw 21 and may be varied readily by rotating the screw until the desired position of the tool holding member is attained. The lower end 22 of the screw 21 is adapted for slidable engagement with the inclined surface 23 to displace the pivot spindle 36 along the pivot axis A—A into locked engagement with the pivot socket 37, the surface being inclined toward the pivot socket in such a manner that a plane B—B normal to the surface is substantially parallel to the pivot axis as best shown in Figs. 2 and 3. Thus, whenever the screw 21 is urged into engagement with the inclined surface 23, the pivot spindel 36 is displaced along the pivot axis A—A and engages the pivot socket 37 to secure the tool holding member 18 to the base member 17 in a rigid manner.

When the tool holder 10 is employed for machining an article 13 as indicated in Fig. 2, the pivot spindle 36 is merely inserted in the pivot socket 37 and the desired adjustment of the tool 12 relative to the article is attained by adjusting the height of the screw 21. Since the article 13 is rotated in the direction of the arrow 16, a force is exerted on the tool 12 as indicated by the arrow 39. This force automatically holds the screw 21 in engagement with the inclined surface 23 along which it slides in a direction parallel to the pivot axis A—A until the pivot spindle 36 is automatically displaced into locked engagement with the pivot socket 37 to secure the tool holding member 18 to the base member 17. Since the pivot spindle 36 and pivot socket 37 are preferably conical, the pivot spindle automatically tends to be displaced along the pivot axis A—A in response to the rotating force 39, thereby supplementing the displacing force resulting from engagement of the contact element 22 of the screw 21 with the inclined surface 23. Any alteration of the adjustment of the tool 12 resulting from the displacement of the tool holding member 18 along the pivot axis A—A may be compensated for readily by the screw 21.

It will be apparent that once the desired adjustment of the tool 12 has been attained, the tool holding member 18 may be detached from and remounted on the base member 17 repeatedly without varying the desired adjustment. The conical pivot spindle 36 engages the conical pivot socket 37 to insure accurate, repeated duplication of the exact initial position of the tool holding member 18 relative to the base member 17 along the pivot axis A—A, and the screw 21 engages the inclined surface 23 to insure precise duplication of the initial position of the tool holding member 18 relative to the base member 17 about the pivot axis A—A. Thus, by employing a plurality of interchangeable tool holding members 18, each holding a properly adjusted tool 12, the tools 12 may be changed readily with complete assurance that the adjustments thereof will not be altered thereby.

Although the tool holder 10 may employ the force exerted on the tool 12 by the article 13 to secure the tool holding member 18 to the base member 17 automatically as previously described, we prefer to provide wedge means 41 for urging the lower end 22 of the adjusting screw 21 into engagement with the inclined surface 23, the wedge means 41 being insertable between the base member and the tool holding member. The wedge means 41 includes a rotatable member 42 which is rotatably mounted on the base member 17 and is provided with a handle 43, the rotatable member 42 being formed with a wedge face 44 which is adapted to engage the lower end of a contact screw 46 carried by the tool holding member 18. When the handle 43 is urged in the direction of the arrow 47 as shown in Fig. 1, the wedge face 44 engages the screw 46 and rotates the tool holding member 18 about the pivot axis A—A to urge the screw 21 into engagement with the inclined surface 23, thereby securing the tool holding member to the base member 17 as previously described.

We prefer to facilitate releasing the tool holding member 18 from the base member 17 whenever it is necessary to change the tool 12 by providing a releasing face 49 formed on the rotatable member 42, the releasing face being adapted for engagement with the end of a projecting screw 51 carried by the tool holding member 18 when the handle 43 of the member 42 is displaced in a direction opposite to that indicated by the arrow 47.

As best shown in Fig. 3, we prefer to provide readily releasable retaining means 53 for securing the tool holding member 18 to the base member 17 to prevent inadvertent release of the tool holding member. The retaining means 53 is mounted on the pivot element 35 and includes a reciprocable catch 54 which extends through a bore 56 in the pivot element 35 into a groove 57 in the pivot spindle 36, the catch 54 being urged into the groove 57 by a compression spring 58 which is disposed in a counterbore 59 in the pivot element 35. The catch 54 is provided with a knob 61 thereon for convenient manipulation.

The provision of the screw 21 effectively reduces the overhang of the tool 12 by providing a point of support between the pivot axis A—A and the free end of the tool. The bending moment produced by the force exerted on the tool 12 by the article 13 as indicated by the arrow 39 is resisted by forces acting at the adjusting set screw 21 as indicated by the arrow 62 and at the pivot axis A—A as indicated by the arrow 63, the lateral overhang being the distance between the arrows 39 and 62. Thus, the adjusting set screw 21 reduces the lateral overhang of the tool 12 from the distance between the arrows 39 and 62 to provide a more rigid structure for the tool holder 10. The longitudinal overhang is represented by the relatively small distance between the adjusting set screw 21 and the tool 12 measured parallel to the pivot axis A—A as indicated by the dimensional arrow 64 of Fig. 3.

Our invention provides a simple and efficient tool holder 10 which permits repeated removal and installation of the tool holding member 18 without altering an initial adjustment of the tool 12. Thus, by employing a plurality of interchangeable tool holding members 18 each having a properly adjusted tool 12 secured thereto, the tool holding members 18 may be changed repeatedly in accordance with the requirements of a given machining operation without altering the initial adjustments of the tools. The initial adjustments may be made by a skilled operator and subsequent operations may be performed by a relatively unskilled operator, if desired.

The pivot spindle 36 and pivot socket 37 provide a readily releasable and positive means for securing the tool holding member 18 to the base member 17 and cooperate with the screw 21 to insure accurate duplication of the position of the tool holding member despite repeated installations and removals. The inclined surface 23 provides an effective means for seating the pivot spindle 36 in the pivot socket 37 whenever the lower end 22 of the screw 21 is urged into engagement with the inclined surface in response to a force applied to the tool 12 by the article 13, or a force applied to the tool holding member 18 by the wedge means 41. The pivot spindle 36 may be separated from the pivot socket 37 readily by the releasing face 49 to release the tool holding member 18 whenever desired.

It will be understood that since the pivot spindle 36 and pivot socket 37 are preferably conical, the pivot spindle automatically tends to be displaced along the pivot axis A—A into engagement with the pivot socket in response to rotation of the tool holding member 18 about the pivot axis by the rotating force 39 or wedge means 41 to supplement the action of the contact element 22 and inclined surface 23. It may be desirable to eliminate the inclined surface 23 for some installations and rely upon the action of the conical spindle 36 and socket 37, without departing from the spirit of the invention.

The construction of the tool holder 10 and the provision of the adjusting means, including the screw 21, materially reduce the overhang of the tool holding member 18 and tool 12, thereby providing a more rigid structure for the tool holder and more adequate support for the tool held thereby.

Although we have described an exemplary embodiment of our invention and have considered an application thereof to lathes, we do not intend to be limited to the specific disclosures contained herein since various changes, modifications, and substitutions may be incorporated without depart from the spirit of the invention, and we hereby reserve the right to all such changes, modifications, and substitutions as properly come within the scope of our appended claims.

We claim as our invention:

1. In a tool holder, the combination of: a base member having a pivot socket formed therein which provides a pivot axis, said base member having a surface thereon which is inclined relative to said pivot axis so that a plane perpendicular to said inclined surface is substantially parallel to said pivot axis; a tool holding member having a pivot spindle formed thereon which is adapted for insertion into said pivot socket and is rotatable therein to permit rotation of said tool holding member relative to said base member about said pivot axis, said pivot spindle being displaceable in said pivot socket along said pivot axis and being adapted for releasable engagement with said pivot socket to secure said tool holding member to said base member; adjusting means carried by said tool holding member, said adjusting means being adapted for engagement with said inclined surface to adjust the position of said tool holding member relative to said base member about said pivot axis and being adapted for slidable engagement with said inclined surface to displace said pivot spindle along said pivot axis and into engagement with said pivot socket when said adjusting means is urged into engagement with said inclined surface, in order to secure said tool holding member to said base member; wedge means for urging said adjusting means into engagement with said inclined surface, said wedge means being rotatably mounted on said base member and being adapted for insertion between said tool holding member and said base member; and releasing means for displacing said pivot spindle along said pivot axis and out of engagement with said pivot socket in order to release said tool holding member from said base member, said releasing means being rotatably mounted on said base member and being adapted for engagement with said tool holding member.

2. In a tool holder, the combination of: a base member having a substantially conical pivot socket formed therein which is symmetrical about a pivot axis; a tool holding member having a substantially conical pivot spindle formed thereon which is rotatable in said pivot socket about said pivot axis, said pivot spindle being displaceable along said pivot axis into engagement with said pivot socket to secure said tool holding member to said base member, one of said members having a surface which is inclined with respect to said pivot axis in the direction of increasing taper of said substantially conical pivot socket and pivot spindle; a contact element carried by the other of said members and adapted to slidably engage said inclined surface; and wedge means rotatably mounted one of said members, said wedge means being insertable between said tool holding member and said base member to urge said contact element into engagement with said inclined surface so as to cause said contact element to tend to slid along said inclined surface, whereby to displace said pivot spindle relative to said pivot socket along said pivot axis and into engagement therewith.

3. A tool holder as defined in claim 2 including means carried by said wedge means for displacing said tool holding member relative to said base member along said pivot axis in a direction to withdraw said pivot spindle from said pivot socket.

4. In a tool holder, the combination of: a base member; a tool holding member; pivot means for connecting said members and providing a pivot axis, said pivot means permitting rotation of said tool holding member relative to said base member about said pivot axis and permitting limited movement of said tool holding member relative thereto along said pivot axis, one of said members having a surface which is located without and spaced from said pivot means and which is so inclined with respect to said pivot axis that, if extended, it would intersect said axis at an acute angle; and a contact element carried by the other of said members in a position to engage said inclined surface, said contact element being slidable along said inclined surface so as to tend to move said tool holding member relative to said base member along said pivot axis in response to any tendency of said tool holding member to rotate relative to said base member about said pivot axis.

5. A tool holder as set forth in claim 4 including a wedge carried by and movable relative to one of said members, said wedge being insertable between said members to rotate said tool holding member relative to said base member so as to urge said contact element into engagement with said inclined surface.

ANTHONY KYLE.
JOHN A. JOHNSON.

REFERENCES CITED

The following references are of record in the file of this patent:

UNITED STATES PATENTS

| Number | Name | Date |
| --- | --- | --- |
| 764,466 | Henry | July 5, 1904 |
| 1,684,011 | Cichon | Sept. 11, 1928 |
| 2,389,853 | Harris | Nov. 27, 1945 |
| 2,389,858 | Kyle | Nov. 27, 1945 |